United States Patent
Wu

[11] Patent Number: 5,255,544
[45] Date of Patent: Oct. 26, 1993

[54] HOUSING FOR A LOCK IN AN AUTOMOBILE STEERING LOCK

[76] Inventor: Wen-Yin Wu, No. 22, Chung Chen 2nd Rd., 8th Fl. Room #2, Kaohsiung City, Taiwan

[21] Appl. No.: 966,519

[22] Filed: Oct. 26, 1992

[51] Int. Cl.⁵ .............................................. B60R 25/02
[52] U.S. Cl. ........................................ 70/209; 70/226; 70/360; 70/417
[58] Field of Search ................. 70/209, 226, 360, 417, 70/211, 212, 225, 237, 238

[56] References Cited

U.S. PATENT DOCUMENTS

| | | | |
|---|---|---|---|
| 1,342,728 | 6/1920 | Welch | 70/360 |
| 1,663,044 | 3/1928 | Furlang | 70/237 X |
| 1,846,782 | 2/1932 | Ballamos | 70/237 |
| 2,714,815 | 8/1955 | Nordstrom | 70/211 |
| 3,855,826 | 12/1974 | Hori | 70/417 X |
| 4,611,477 | 9/1986 | Crites | 70/417 X |
| 4,918,949 | 4/1990 | Newbold | 70/417 X |
| 5,107,691 | 4/1992 | Wu | 70/209 |

FOREIGN PATENT DOCUMENTS

| | | | |
|---|---|---|---|
| 2847480 | 5/1980 | Fed. Rep. of Germany | 70/417 |
| 2415184 | 9/1979 | France | 70/417 |
| 0620268 | 11/1980 | Switzerland | 70/417 |

*Primary Examiner*—Lloyd A. Gall
*Attorney, Agent, or Firm*—Bacon & Thomas

[57] ABSTRACT

A lock housing for an automobile steering lock device has a heat-treated, very hard protective cylinder between a cylindrical wall of the housing and the lock. The lock has a rod-shaped dead bolt extending in a same-shaped hollow space in the housing to extend into one of the grooves in an elongate rod member to immovably lock the rod member in an elongate tubular member in any one of a plurality of positions.

4 Claims, 5 Drawing Sheets

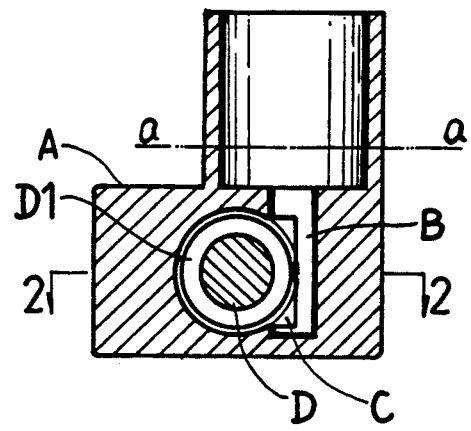
Fig. 1
(PRIOR ART)
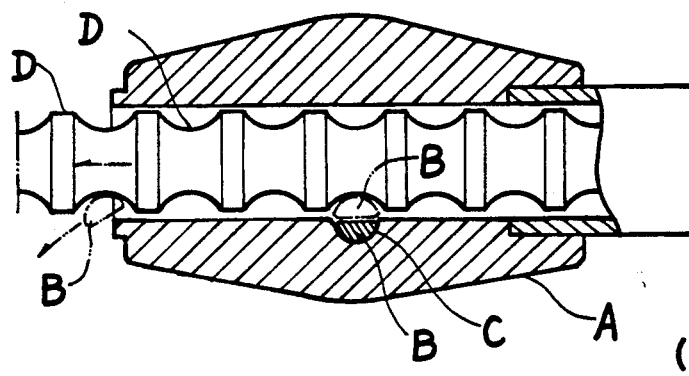
Fig. 2
(PRIOR ART)
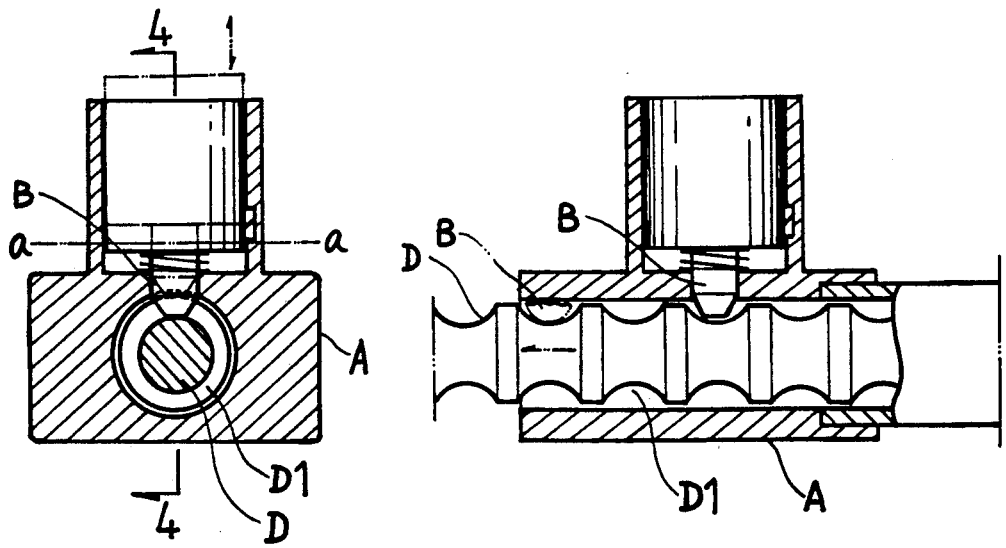
Fig. 3
(PRIOR ART)
Fig. 4
(PRIOR ART)

HOUSING FOR A LOCK IN AN AUTOMOBILE STEERING LOCK

BACKGROUND OF THE INVENTION

Conventional automobile steering locks generally have the disadvantages described below.

1. Although an elongate tubular member and an elongate rod member are heat treated to have anti-sawing and anti-striking capabilities, the associated housing and lock with a copper key block are not possible to be heat treated. If the housing and the lock are sawn off, as shown in FIGS. 1 and 3 along line a—a, the anti-theft function of the device is totally lost.

2. Conventional locks for automobile steering lock devices are locked either by means of rotation or by pressing inward. The rotatable lock has a semi-circular dead bolt as shown in FIGS. 1 and 2, while the pressing lock has a rod-shaped dead bolt to extend in one of grooves in the rod member as shown in FIGS. 3 and 4. When the rod member combined with one of these locks receives an external strike or blow, a reactional shearing force is concentrated on the dead bolt and the groove so that the dead bolt may be broken as follows:

A. The rotatable semi-circular dead bolt as shown in FIGS. 1 and 2 turns away from the grooves of the rod member in an open condition, and turns to extend into one of the grooves in a locked condition. There is a hollow space C in the housing in which the dead bolt B moves. When the dead bolt B is broken, the space C gives the dead bolt B enough space to move either in the space C or in the groove D1. Either way it cannot stop the rod member from moving out of the housing A.

B. The pressing-inward dead bolt B as shown in FIGS. 3 and 4, extends vertically into one of the grooves D1 to lock the rod member D. When the dead bolt B is broken, it remains in the groove D1 and can be pulled, together with the rod member D, out of the housing A, thereby losing its locking function.

SUMMARY OF THE INVENTION

This invention comprises an improved housing for a lock in an automobile steering lock device to prevent the lock from illegal theft by means of sawing or striking.

The housing for a lock in an automobile steering lock device has a heat-treated protective cylinder of high hardness provided between a cylindrical wall of the housing and the lock structure. A dead bolt extending from the bottom of the lock extends into a hollow space just large enough for the dead bolt so that even if the dead bolt is broken off the lock, it cannot be pulled together with the rod member out of the tubular member.

BRIEF DESCRIPTION OF THE DRAWINGS

FIG. 1 is a cross-sectional view of a rotatable lock in a conventional automobile steering lock.

FIG. 2 is a partial cross-sectional view along line 2—2 in FIG. 1.

FIG. 3 is a cross-sectional view of a lock in another conventional automobile steering lock.

FIG. 4 is a partial cross-sectional view along line 4—4 in FIG. 3.

DETAILED DESCRIPTION OF THE INVENTION

Figure 5:
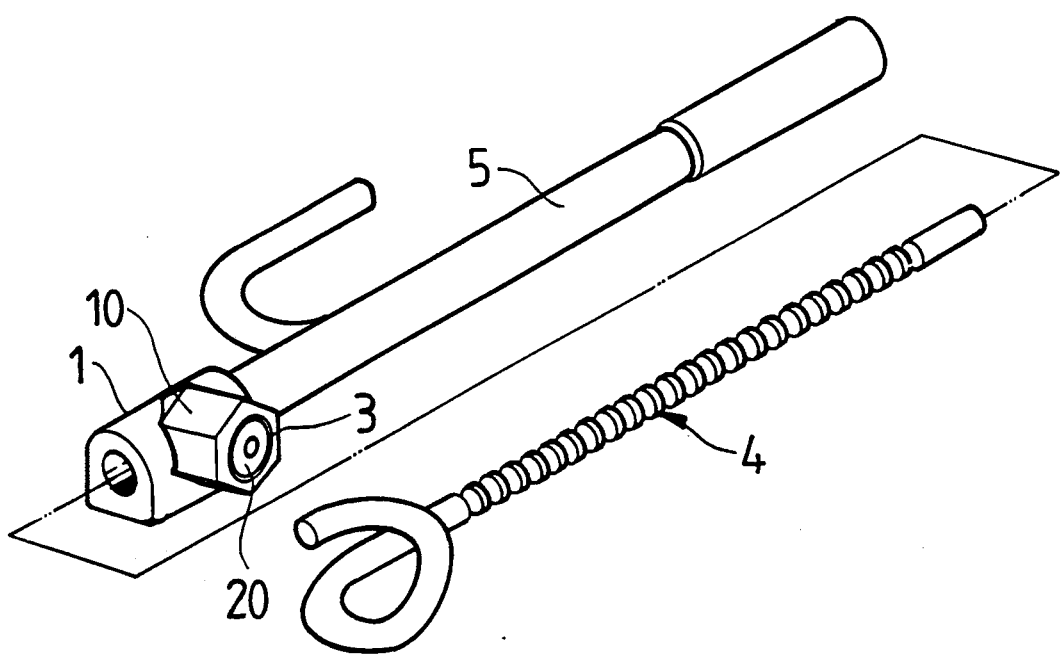
FIG. 5 is an exploded perspective view of the automobile steering lock device of the present invention.
Figure 6:
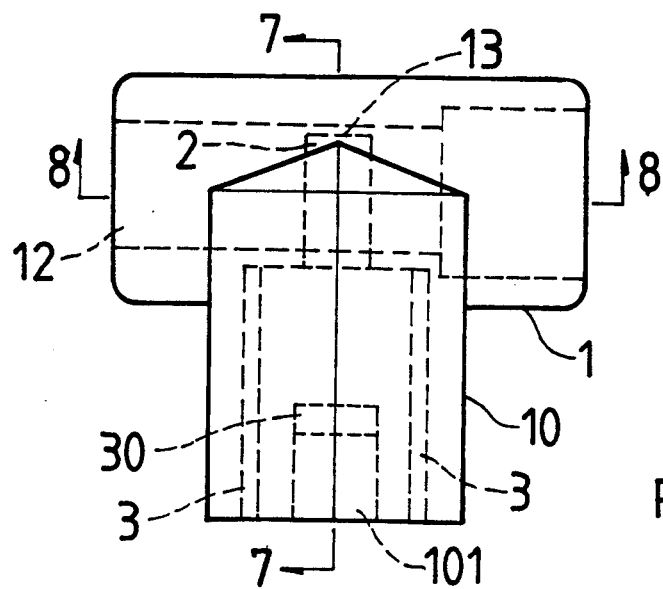
FIG. 6 is a view of a first embodiment of a housing for a lock in the automobile steering lock device of the present invention.
Figure 7:
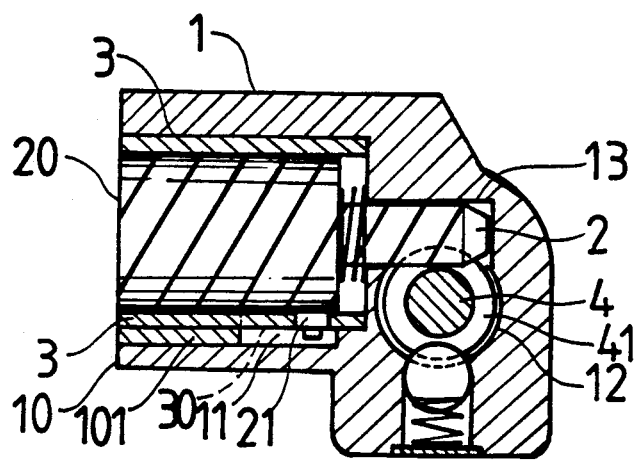
FIG. 7 is a cross-sectional view along line 7—7 in FIG. 6.
Figure 8:
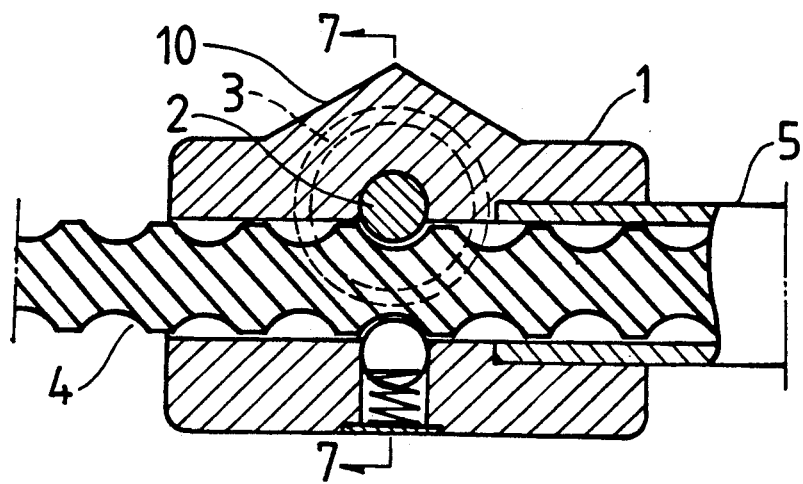
FIG. 8 is a cross-sectional view along line 8—8 in FIG. 6.

A housing 1 for an lock in an automobile steering lock device of the present invention, as shown in FIGS. 6–8, comprises a dead bolt 2 protruding out of the lock 20 which is fitted within a protective cylinder 3 having high hardness by means of heat treatment. The protective cylinder 3 performs a protective function against sawing and striking the housing, being fixed in a cylindrical wall 10 of the housing 1. The cylindrical wall 10 has a notch 11 for an engaging projection 21 to move therein. The protective cylinder 3 has an engaging hole 30 positioned to correspond to the location of notch 11 in the cylindrical wall 10 so that the engaging projection 21 can fit therein to fasten the lock 20 when the lock 20 is pushed inward. The notch 11 is formed in the course of molding the housing 1 and is sealed by a stopper 101 fixed immovably to the cylindrical wall 10 by known means, such as welding, etc..

The cylindrical wall 10 has an opening 13 intersecting a side of, not the central portion of, a passageway 12 defined in an elongate tubular member 5. The opening 13 is bored so as to communicate with an upper portion of the passageway 12 so that the dead bolt 2 can extend therein and enter one of the grooves 41 formed around the longitudinal outer surface of the rod member 4 thereby immovable locking the rod member 4.

Should the dead bolt 2 be sawn off, the lock 20 will prevent the cut-off dead bolt 2 from falling out of the housing 1. The opening 13 is just large enough to contain the dead bolt 2, such that the cut-off dead bolt 2 will still extend into the groove 41 to prevent illegal unlocking this lock device.

If a thief should attempt to saw the lock 20, the hard protective cylinder 3 will protect it from being sawn. In addition, the protective cylinder 3 is combined in such a way with the elongate tubular member 5 and the rod member 4 that the lock 20 with the dead bolt 2 cannot be sawn from any direction, or any point.

Figure 9:
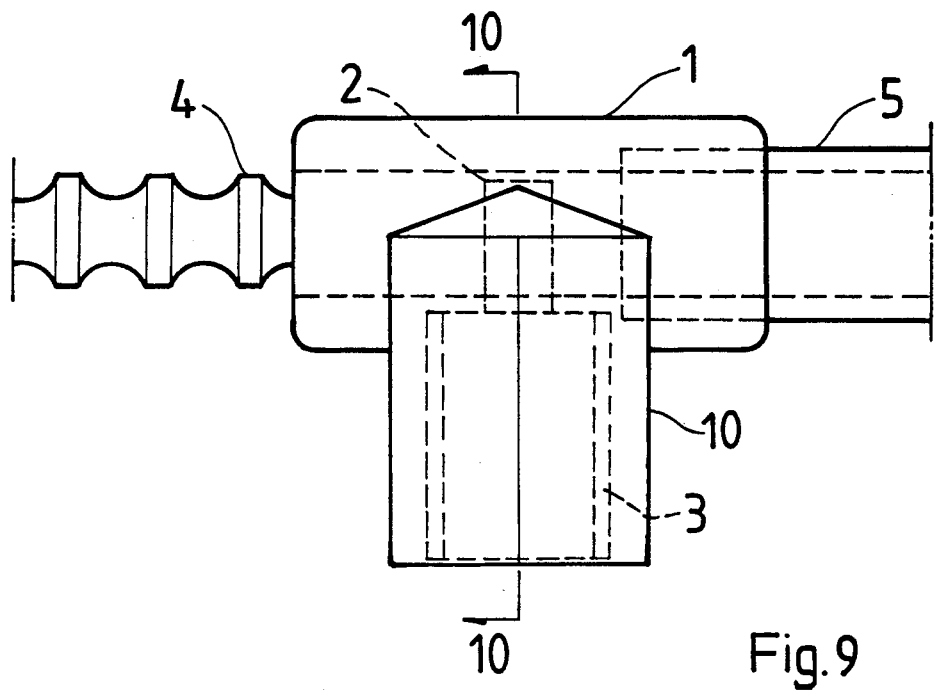
FIG. 9 is a top view of a second embodiment of a housing for a lock in the automobile steering lock device of the present invention.
Figure 10:
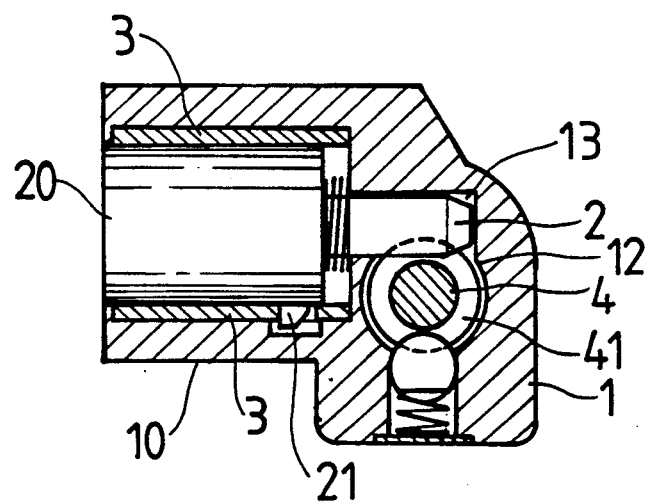
FIG. 10 is a cross-sectional view along line 10—10 in FIG. 9.

FIGS. 9 and 10 show a second embodiment of a housing for a lock in an automobile steering lock, having a similar structure to the first embodiment. The only difference is in the structure of the notch 11 of the cylindrical wall 10.

Figure 11:
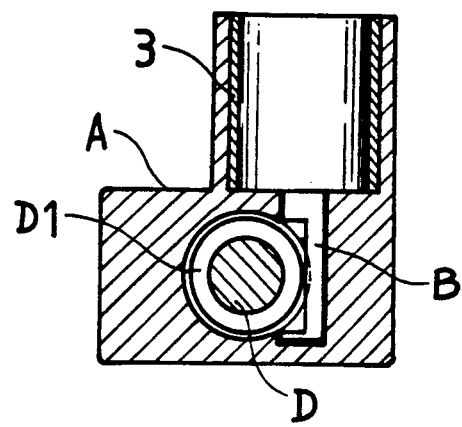
FIG. 11 is a cross-sectional view of the protective cylinder of the present invention used in a conventional automobile steering lock housing.
Figure 12:
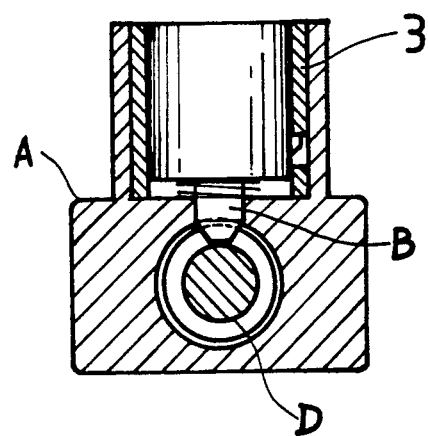
FIG. 12 is a cross-sectional view of the protective cylinder of the present invention used in another type of conventional automobile steering lock housing.

The protective cylinder 3 can also be adapted to be used in a housing for a lock in a conventional automobile steering lock as shown in FIGS. 11 and 12.

The housing for a lock in an automobile steering lock of the present invention eliminates the drawback that a housing is impossible to be given heat-treatment, thereby securing the anti-theft function for an automobile without fail.

I claim:

1. In an automobile steering wheel lock having an elongated hollow tubular member with a rod member having a plurality of circumferential grooves slidably received in the elongated tubular member, an improved locking mechanism housing for locking the rod member in a desired position comprising:
   a) the housing operatively associated with the elongated tubular member, the housing defining a passageway in alignment with the hollow tubular member such that the rod member extends through the passageway and the housing having a generally cylindrical wall defining a lock mechanism chamber in communication with the passageway, the chamber having a front opening;
   b) a notch defined by the generally cylindrical wall opening into the lock mechanism chamber;
   c) a generally cylindrical protective member formed of heat treated material fixed to the housing so as to line the lock mechanism chamber, the protective member defining a hole in general alignment with the notch; and,
   d) a lock mechanism fixedly attached to the protective member by a projection extending through the hole defined by the protective member and into the notch and displaced inwardly from the front opening.

2. The improved locking mechanism housing of claim 1 wherein the housing further defines an opening extending between the lock mechanism chamber and the passageway such that the opening communicates with the passageway at a location laterally displaced from a central longitudinal axis of the passageway.

3. The improved locking mechanism housing of claim 2 further comprising a locking bolt extending from the lock mechanism so as to be slidable through the opening into the passageway, the locking bolt having cross-sectional dimensions substantially the same as cross-sectional dimensions of the opening.

4. The improved locking mechanism housing of claim 1 further comprising a stopper member fixedly attached to the housing and located in the notch between the front opening and the projection of the lock mechanism.

* * * * *